US012460620B2

(12) United States Patent
Vik

(10) Patent No.: US 12,460,620 B2
(45) Date of Patent: Nov. 4, 2025

(54) FLOATING WINDMILL

(71) Applicant: Oddmund Vik, Sandnes (NO)

(72) Inventor: Oddmund Vik, Sandnes (NO)

( * ) Notice: Subject to any disclaimer, the term of this patent is extended or adjusted under 35 U.S.C. 154(b) by 0 days.

(21) Appl. No.: 17/926,815

(22) PCT Filed: Jun. 11, 2021

(86) PCT No.: PCT/NO2021/050143
§ 371 (c)(1),
(2) Date: Nov. 21, 2022

(87) PCT Pub. No.: WO2021/251830
PCT Pub. Date: Dec. 16, 2021

(65) Prior Publication Data
US 2023/0204013 A1  Jun. 29, 2023

(30) Foreign Application Priority Data
Jun. 11, 2020 (NO) .................................. 20200689

(51) Int. Cl.
*F03D 13/25* (2016.01)
*B63B 21/50* (2006.01)
(Continued)

(52) U.S. Cl.
CPC ............ *F03D 13/25* (2016.05); *B63B 21/502* (2013.01); *B63B 35/44* (2013.01); *E02D 27/425* (2013.01);
(Continued)

(58) Field of Classification Search
CPC ............................ F03D 13/25; F05B 2240/93
See application file for complete search history.

(56) References Cited

U.S. PATENT DOCUMENTS 3,899,990 A  8/1975 Lecomte
8,729,723 B2 * 5/2014 Boureau ................. F03D 80/85
290/55
(Continued)

FOREIGN PATENT DOCUMENTS

DE      19744174 A1   4/1999
DE  102009040648 A1   3/2011
(Continued)

OTHER PUBLICATIONS

Løland, Anders Holten; International Search Report; PCT/NO2021/050143; Dated: Sep. 6, 2021; 3 pages.
(Continued)

*Primary Examiner* — Danielle M. Christensen
(74) *Attorney, Agent, or Firm* — Bradley Arant Boult Cummings LLP

(57) ABSTRACT

The invention provides a floating windmill, comprising a floating element and a wind turbine. The floating windmill is distinguished in that it further comprises: a tension leg, an anchoring, a buoyancy element, a swivel and a cross bar, wherein the swivel is arranged in the buoyancy element. In operation, the floating windmill in operation is configured with the wind turbine in an upper end of the floating element extending up above the sea level, with a lower end or part of the floating element submerged in the sea, with the cross bar in one end connected to the lower part or end of the floating element and in the opposite end connected to the buoyancy element, with the buoyancy element fully submerged, preferably at safe draught depth below surface for service vessels and/or marine transport ships, with the tension leg arranged between the buoyancy element and the anchoring on the seabed. The floating windmill configured with the wind turbine in the upper end can weathervane freely around the buoyancy element, wherein in a low force condition when the forces by ocean current, wind and waves
(Continued)

are low the floating element, the buoyancy element and the tension leg is oriented in substance in vertical direction and the cross bar is oriented in substance in horizontal direction, wherein in a high force condition when the forces by ocean current, wind and waves are high the shape of the floating element, cross bar, buoyancy element and tension leg is stretched by the forces to provide a shape like a lazy-s configuration, which change in shape and dynamic behavior reduce extreme stress levels.

7 Claims, 3 Drawing Sheets

(51) Int. Cl.
*B63B 35/44* (2006.01)
*E02D 27/42* (2006.01)
*E02D 27/52* (2006.01)
(52) U.S. Cl.
CPC ...... *E02D 27/525* (2013.01); *B63B 2035/446* (2013.01)

(56) References Cited

U.S. PATENT DOCUMENTS

| | | | |
|---|---|---|---|
| 9,670,908 B2* | 6/2017 | Dupin De La Gueriviere | B63B 21/507 |
| 9,902,468 B2 | 2/2018 | Prats | |
| 10,661,862 B2* | 5/2020 | Melis | B63B 21/502 |
| 11,236,728 B2* | 2/2022 | Creighton | F03D 5/02 |
| 11,384,736 B1* | 7/2022 | Piasecki | B63B 39/00 |
| 11,655,007 B2* | 5/2023 | Hummel | B63B 1/107 416/204 R |
| 2016/0075413 A1* | 3/2016 | Nebrera Garcia | E02D 27/425 114/122 |
| 2019/0040840 A1 | 2/2019 | Rohrer | |
| 2021/0355911 A1* | 11/2021 | Marc | F03D 7/02 |

FOREIGN PATENT DOCUMENTS

| | | |
|---|---|---|
| EP | 0287173 A1 | 10/1988 |
| JP | S61155089 A | 7/1986 |
| NL | 1035907 C | 3/2010 |
| WO | WO-2010071433 A2 | 6/2010 |
| WO | WO-2013001121 A1 | 1/2013 |
| WO | WO-2019143283 A1 | 7/2019 |
| WO | WO-2021231102 A1 | 11/2021 |

OTHER PUBLICATIONS

Petrowiki, "File:Flexible Pipe.PNG," https://petrowiki.spe.org/File:Flexible_Pipe.PNG, last accessed Dec. 20, 2023, 1 page.
Davidson, Josh et al., "Mathematical Modelling of Mooring Systems for Wave Energy Converters—A Review," Energies, vol. 10, 2017, 46 pages.
Shotbolt, Keith, "Lazy-S risers offer advantages in the ultra deep," Offshore, Sep. 1, 2008, https://www.offshore-mag.com/production/article/16761605/lazys-risers-offer-advantages-in-the-ultra-deep, last accessed Dec. 20, 2023, 7 pages.
Jiang, Zhiyu, "Installation of offshore wind turbines: A technical review," Renewable and Sustainable Energy Reviews, vol. 139, Issue 110576, Apr. 2021, Elservier, Grimstad, Norway, 21 pages.

\* cited by examiner

FLOATING WINDMILL

TECHNICAL FIELD

The present invention relates to anchored floating structures, such as floating windmills, also termed floating wind turbines. More specifically, the invention relates to a floating windmill with reduced cost compared to produced electric energy, if fabrication, transport, installation and maintenance is included in the cost and leveled out over the estimated lifespan of at least 20-30 years.

BACKGROUND ART

The shift towards greener energy will be facilitated if the cost for floating wind energy can be reduced. Enormous areas offshore can thereby be available for electric energy produced by floating windmills. Floating energy islands or floating infrastructure hubs can also facilitate the shift towards greener energy.

The state-of-the-art with respect to floating windmills are presumably Hywind, WindFloat and Sway. However, cost is a limiting factor for the utilization of floating wind, and economic subsidizing is still required for the concepts to be economically viable.

New windmills leading to reduced cost would benefit the shift towards greener energy. The objective of the present invention is to provide one such new windmill. New floating energy islands or infrastructure hubs can also facilitate the shift towards greener energy. A further objective of the present invention is to provide said floating energy islands or infrastructure hubs.

SUMMARY OF INVENTION

The invention provides a floating windmill, comprising a floating element and a wind turbine. The floating windmill is distinguished in that it further comprises:
- a tension leg, an anchoring, a buoyancy element, a swivel and a cross bar, wherein the swivel is arranged in the buoyancy element,
- wherein the floating windmill in operation is configured with the wind turbine in an upper end of the floating element extending up above the sea level, with a lower end or part of the floating element submerged in the sea, with the cross bar in one end connected to the lower part or end of the floating element and in the opposite end connected to the buoyancy element, with the buoyancy element fully submerged, preferably at safe draught depth below surface for service vessels and/or marine transport ships, with the tension leg arranged between the buoyancy element and the anchoring on the seabed,
- wherein the floating element with the wind turbine in the upper end can weathervane freely around the buoyancy element, wherein in a low force condition when the forces by ocean current, wind and waves are low the floating element, the buoyancy element and the tension leg is oriented in substance in vertical direction and the cross bar is oriented in substance in horizontal direction, wherein in a high force condition when the forces by ocean current, wind and waves are high the shape of the floating element, cross bar, buoyancy element and tension leg is stretched by the forces to provide a shape like a lazy-s configuration, which change in shape and dynamic behavior reduce extreme stress levels.

In one preferable embodiment, the floating element is a spar buoy.

In other preferable embodiments, the floating element is a rectangular or triangular, polygonal, elliptic or circular floating or semi-submersible structure with one, two, three, four or more windmill towers.

The submerged part of the floating element can extend far below the point where the cross bar is connected, which is preferable for reducing or eliminating tilting of the floating element in downwind direction by the load of the wind on the turbine blades. Retaining an angle of the turbine blade plane in substance perpendicular to the wind direction increases efficiency.

The terms "vertical direction" of the floating element and "the cross bar is oriented in substance in horizontal direction between the buoyancy element and the floating element" are relative terms, not necessarily meaning literally vertical within a small margin or horizontal within a small margin. With a spar buoy as the floating element, and low force condition, the terminology will typically be literally as described, with other floating elements the terminology is relative, but the dynamic "stretching out" more or less to a lazy-s like shape by the forces at higher force condition is retained as an essential feature. This is correct also for embodiments with floating element retaining a vertical orientation even far into high force condition since the orientation change of the cross bar opens up the angle above the cross bar towards the floating element. If the floating element is a triangular, polygonal, quadratic, rectangular or otherwise shaped floating structure with one, two, three or more windmills, the vertical orientation of the floating element may be literally correct only for the windmill towers.

The axial movements by said stretching, combined with lateral movements by orientation change and position change, contribute in reducing the extreme stress in the structural elements. Said movements of the elements take up a significant part of the energy that else had resulted in higher stress levels in the structural elements. Said movements also reduce acceleration on the elements, since the dynamic flexibility works with the forces and strain. The effect, compared to a stiff rigid structure, apparently reduces the extreme stress level by at least 10%, 20%, 30% or 50%, depending on several factors and the prevailing conditions.

Preferably, the floating windmill comprises a releasable coupling between the cross bar and the buoyancy element. Preferably, the floating windmill also comprises a releasable coupling between the cross bar and the floating element. Releasable coupling in this respect means a coupling that can be coupled and decoupled/released at the windmill site offshore. Releasable couplings can preferably comprise guide funnels or guide structures and/or guidelines, for facilitates coupling and decoupling/release with or without assistance by an ROV (Remotely Operated Vehicle).

Preferably, the floating windmill includes no gear rim in the wind turbine/nacelle of the floating element. The swivel in the buoyancy element is sufficient to take up the rotation when weathervaning.

The invention also provides a method of fabrication, transport, installation and/or maintenance of the floating windmill, comprising to fabricate, transport, install or maintain the windmill in components.

Prefabrication of elements of the windmill, or parts of elements, preferably takes place at a fabrication site. The elements, or parts thereof are transported to a preassembly site or a transport position, from where transport to installation site takes place, where final assembly of parts of elements and/or the elements take place.

In one preferable embodiment, the method comprises that installation takes place by transporting the floating element and the wind turbine to the windmill site, where said components are coupled to the buoyancy element that has been preinstalled with an anchor on the seabed. Preferably, the floating element has the crossbar connected, wherein the installation involves connecting the crossbar to the buoyancy element. Alternatively, the buoyancy element has the crossbar connected, wherein the installation involves connecting the floating element to the crossbar. Preferably, the buoyancy element and/or the vessel used for the operation includes a buoyancy system allowing to bring the buoyancy element up and down between a surface position and a submerged position, whereby the coupling can take place near or at the surface position.

A variable, or no-rigid tension leg can be preferable, or combinations of rigid and flexible tension legs, as will be described in more detail below. More specifically, the tension leg can be one or more wires, such as three or four wires, or one or more rigid tension legs, such as three or four rigid tension legs. However, a combination of rigid and flexible tension legs is preferable, with the rigid tension legs, for example three rigid tension legs, extending from the anchor to an operation position of the buoyancy element at the largest operational depth of the buoyancy element, in which position the rigid elements can be fixedly coupled or decoupled to the buoyancy element, wherein a wire winch system preferably is integrated in the buoyancy element, operable to allow the buoyancy element to float controlled up to the surface and down to the operation position. Installation, coupling and decoupling of the crossbar are thereby facilitated. The rigid part or lower part of the tension legs preferably comprises truss structure, for increased torsional stiffness and/or for retaining relative positions. The coupling to the anchor may include a swivel, to reduce or eliminate torsional forces on the anchor.

In a preferable embodiment, the method comprises that only the anchor is preinstalled, and the rest of the structure, in one or several parts, are prefabricated and towed out to the position of the preinstalled anchor, where the anchor is coupled to the tension legs and any further separate elements are coupled together. A guideline with funnel and transponder is preferably arranged to the anchor for facilitating the operation.

In another preferable embodiment, the method comprises that maintenance takes place by replacing components on the windmill field, by installing a new component and transporting away the part that is damaged or need maintenance or repair, as one combined operation, preferably with by a single trip with a single vessel.

Some advantages of the floating windmill of the invention are:

Lower weight in the wind turbine/nacelle, due to no gear rim, which saves at least 3-5 times the corresponding floating element structure weight subsea.

Only one anchoring point is required, reducing safe zone area.

Self-directing orientation by weathervaning.

Self-dampening effect by shape variation, reducing extreme tensions.

Simplified cable routing, no swivel required in wind turbine/nacelle.

Simplified logistics, by fabrication into parts, transport into parts or partly preassembled structure, facilitating fabrication, transport and installation, allowing fewer and/or smaller vessels at lower rate than for larger structures.

Simplified maintenance, by replacing/maintenance of only the element requiring maintenance, on the field site, reducing windmill downtime and vessel operations time.

The total cost savings are roughly estimated to be more than 30%, 40% or even 50% per MWh produced, if fabrication, transport, installation and maintenance are included in the cost and leveled out over a lifespan of at least 20 or 30 years.

In some embodiments, the floating windmill of the invention is not only a floating windmill but also a floating energy island or a floating infrastructure hub, comprising one, two, three or more of the anchoring systems of claim 1. Embodiments with two or more anchoring systems as prescribed will have reduced or eliminated functionality for weathervaning but the essential reduction of extreme stress levels will be retained.

DETAILED DESCRIPTION OF THE INVENTION

Figure 1:
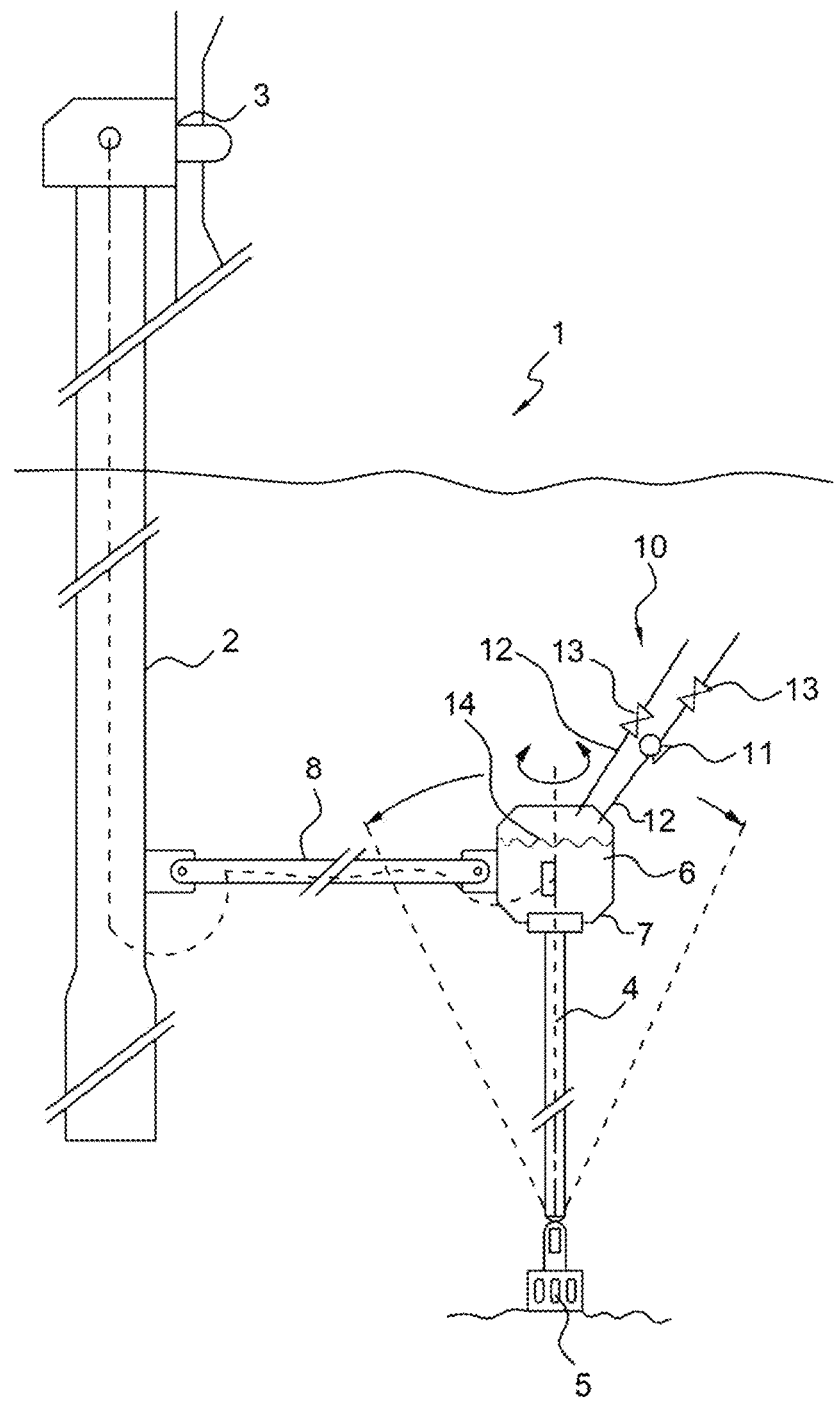
FIG. 1 illustrates an embodiment of a floating windmill of the invention.

Reference is made to FIG. 1, illustrating an embodiment of a floating windmill 1 of the invention, comprising a floating element 2 and a wind turbine 3. The floating windmill further comprises: a tension leg 4, an anchoring 5, a buoyancy element 6, a swivel 7 and a cross bar 8, wherein the swivel is arranged in the buoyancy element.

The illustrated floating windmill comprises a spar buoy as the floating element 2, with the wind turbine 3 in the upper end above the sea level. The lower end of the floating element is submerged in the sea and is connected to one end of the cross bar 8 and the opposite end of the cross bar is connected to the buoyancy element 6. The buoyancy element 6 is fully submerged and in a lower end is connected to the upper end or part of tension leg 4, which lower end or part of the tension leg is connected to the anchoring 5.

The anchoring preferably is a weight anchor or a suction anchor or a combination of a weight anchor and a suction anchor. Other anchors, such as pile anchors, can be used.

The floating element 2 can weathervane freely around the buoyancy element 6, as indicated by a rotation symbol above the buoyancy element.

The operation state as illustrated is a low force condition, meaning that the forces by ocean current, wind and waves are low, not forcing the components/elements significantly out of an equilibrium condition or orientation taken when no current, wind or waves are present. Not significantly out of an equilibrium condition or orientation means less than 5° out of orientation for elements oriented vertical or horizontal, as defined.

As the skilled person will understand, the equilibrium condition is deviated from by more than 5° in a high force condition, drawing out the shape of the configuration of the elements towards a lazy s shape. This is illustrated by a turning angle of the tensioning leg and buoyancy element by dashed line, exceeding 5°. For clarity, such dashed line deviation is indicated only for the buoyancy element as being pulled out of vertical orientation by high forces. The skilled person will understand that also the angular orientation of the cross bar and for many embodiments also the angular orientation of the floating element will change when stretched towards a lazy s shape.

Figure 2:
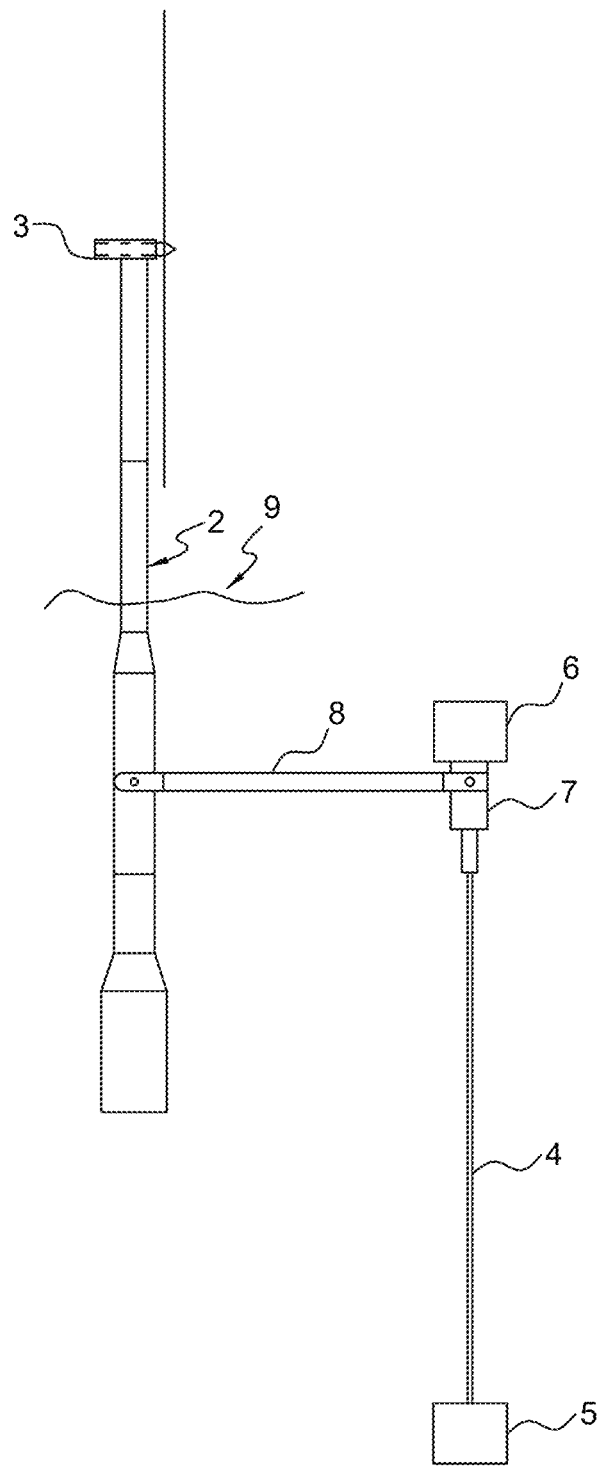
FIG. 2 illustrates an embodiment of a floating windmill of the invention, as viewed from the side.
Figure 3:
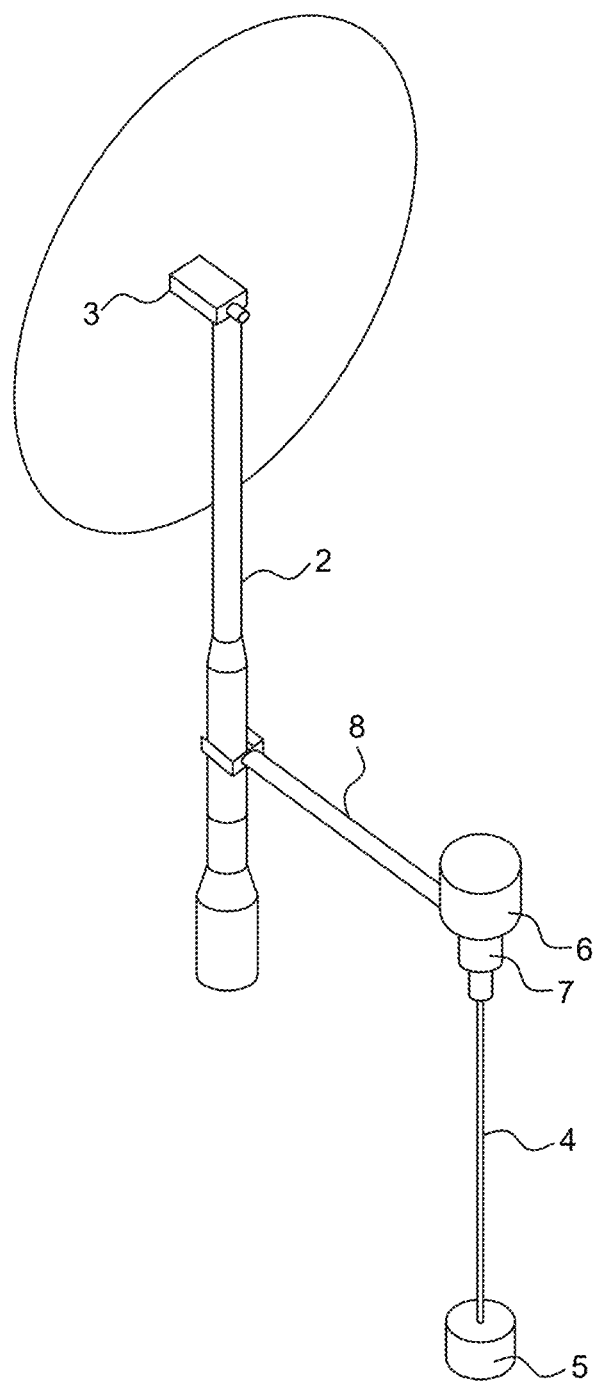
FIG. 3 illustrates the embodiment of FIG. 2 as viewed from an angle.

As mentioned, FIG. 2 illustrates an embodiment of a floating windmill of the invention, as viewed from the side in a low force condition, wherein the s-like shape of the structures is clear. FIG. 3 illustrates the embodiment of FIG. 2 as viewed from an angle. The numeric references are as for FIG. 1, however, FIG. 2 also refer to the waterline by numeric reference 9. FIGS. 2 and 3 are more to scale for a larger depth embodiment than the embodiment illustrated in FIG. 1. The figures are in general but not necessarily out of scale, in order to illustrate features clearly.

Preferably, the anchor, the tension leg and the buoyancy element are preinstalled, whilst the floating element with the cross bar is coupled to the buoyancy element on the windmill site, wherein the cables are preinstalled out from the swivel, arranged on the cross bar and is pulled into the inner part of the floating element, with or without a coupling in dry location inside the floating element. Preassembling can be in alternative configurations, preferably involving coupling at least two preassembled groups of components with the cross bar in one or both ends.

The tension leg can be a flexible wire or a number of flexible wires, preferably combined with a buoyancy system 10 in the buoyancy element 6 or connectable from a vessel, such as a pump 11 and required piping 12 and valves 13 for adjusting a ballast water level 14 in the buoyancy element 6, for moving the buoyancy element 6 up to or near the surface when coupling to the cross bar and down to operation position. The tension leg can also be or comprise a rigid element, or several rigid elements, such as three elements in triangular configuration, providing torsional stiffness. Rigid elements can have a cone and a guideline in the upper end, for allowing controlled deployment when installing, retrieving, and ballasting the buoyancy element 6 with combined ballasting and hoisting. The buoyancy element 6 preferably comprises a retrievable transponder with electrical and/or hydraulic coupling for controlled ballasting and controlled winching, wherein the buoyancy element 6 comprises an electric or hydraulic winch and/or an electric or hydraulic pump or a hydraulic coupling to a ballast pump on the ship.

Preferably, also the buoyancy element comprises a releasable coupling, towards the tension leg.

Preferably, also the floating element comprises a buoyancy system 10 and/or facilities for connecting to a buoyancy system 10 on a vessel. The buoyancy system 10 can be a pump 11, in the floating element or in a vessel, and required piping 12 and valves 13 for adjusting a ballast water level 14 in the floating element. Thereby, installation, replacement or maintenance of the wind turbine, nacelle or parts thereof can be simplified by submerging more of the floating element.

Preferably, the submerging can be down to a level where the nacelle is reachable by a ship crane on the ship used for installation.

As the skilled person will know, the anchor can be a single anchor vertically below the buoyancy element in equilibrium position. However, also several anchors, such as suction anchors are possible embodiments within the term one anchor, arranged in substance close together as one unit below the buoyancy element but positioned apart as the soil conditions dictate for sufficient strength. One big weight anchor that can be weighted on site to sufficient weight/strength is a preferable embodiment in many shallow areas with relatively rigid bottom.

The invention also provides energy islands or energy hubs with or without windmills but with one or more of the maximum stress level reducing structure; a tension leg, an anchoring, a buoyancy element, preferably a swivel, and a cross bar, wherein the swivel, if present, is arranged in the buoyancy element, and wherein said structure is arranged as a dynamic s-lazy s structure stretched out from s to lazy s shape in high force conditions as defined in claim 1.

The floating windmill or energy island of the invention can preferably comprise vertical axis windmills since such windmills can be arranged closer together than horizontal axis windmills. No wind shadow, resulting in no requirement for weathervaning and no requirement for gear rim are further advantages by vertical axis windmills.

The floating windmill or energy island of the invention can preferably comprise a frame with numerous windmills that are self-aligning against the eye of the wind, preferably on a non-weathervaning energy island, or the frame itself weathervanes as a single floating windmill, wherein the frame preferably is arranged on a triangular floater or semi-submerged floater anchored according to the invention.

The floating windmill or energy island of the invention can preferably comprise water current turbines, suspended from the floating windmill or/and anchored, preferably retrievable for facilitating installation and maintenance.

The floating windmill or energy island of the invention can preferably comprise solar panels.

The floating windmill or energy island of the invention can preferably comprise batteries.

The floating windmill or energy island of the invention can preferably comprise any of the energy-producing structures herein described, in any combination, and/or coupling to standalone equipment in the surrounding area, thereby expanding the floating windmill of the invention into an energy island and/or an energy hub.

The invention claimed is:

1. A floating windmill, comprising a floating element and a wind turbine, the floating windmill comprising:
    a tension leg in the form of one or more rigid structures, wires or combined rigid structure and wires, oriented vertical in a low-force operating condition;
    an anchoring;
    a buoyancy element fully submerged in an operating condition, providing tension in the tension leg as arranged between the anchoring and the buoyancy element, wherein the buoyancy element includes a buoyancy system that includes a pump, piping and valves, for adjusting a ballast water level in the buoyancy element;
    a swivel, wherein the swivel is arranged in the buoyancy element;
    a rigid cross bar fully submerged in the operating condition, connecting the buoyancy element and the floating element;
    wherein the floating windmill in operation is configured with the wind turbine on an upper end of the floating element extending up above sea level, with a lower end or part of the floating element submerged in sea, with the rigid cross bar on one end connected to the lower end or part of the floating element and on an opposite end connected to the buoyancy element, with the rigid cross bar fully submerged, with the buoyancy element fully submerged, with the tension leg arranged between the buoyancy element and the anchoring on a seabed;

wherein the floating element with the wind turbine on the upper end can weathervane freely around the buoyancy element, wherein in a low force condition when the forces by ocean current, wind and waves are low, the floating element, the buoyancy element and the tension leg are oriented in a vertical direction within 5° from an equilibrium condition and the rigid cross bar is oriented in a horizontal direction within 5° from the equilibrium condition, wherein, in the equilibrium condition, the floating element, the buoyancy element and the tension leg are oriented in the vertical direction and the rigid cross bar is oriented in the horizontal direction; and wherein in a high force condition when the forces by ocean current, wind and waves are high, a shape of the floating element, the rigid cross bar, the buoyancy element and the tension leg is stretched by the forces to provide a stretched shape, wherein the orientation of the vertical and horizontal elements is deviated from the equilibrium condition by more than 5°, which change in shape and dynamic behavior reduce extreme stress levels in the floating windmill.

2. The floating windmill according to claim 1, including no gear rim in the upper end of the floating element, in at least one of a nacelle and the wind turbine.

3. The floating windmill of claim 1, wherein the fully submerged buoyancy element is at safe draught depth below surface for at least one of service vessels and marine transport ships.

4. A method of at least one of installation and maintenance of a floating windmill, the floating windmill comprising:
   a floating element and a wind turbine, the floating windmill comprising:
   a tension leg in the form of one or more rigid structures, wires or combined rigid structure and wires, oriented vertical in a low-force operating condition;
   an anchoring;
   a buoyancy element fully submerged in an operating condition, providing tension in the tension leg as arranged between the anchoring and the buoyancy element;
   a swivel, wherein the swivel is arranged in the buoyancy element;
   a rigid cross bar fully submerged in the operating condition, connecting the buoyancy element and the floating element;
   wherein the floating windmill in operation is configured with the wind turbine on an upper end of the floating element extending up above sea level, with a lower end or part of the floating element submerged in the sea, with the rigid cross bar on one end connected to the lower end or part of the floating element and on an opposite end connected to the buoyancy element, with the rigid cross bar fully submerged, with the buoyancy element fully submerged, with the tension leg arranged between the buoyancy element and the anchoring on a seabed;

wherein the floating element with the wind turbine on the upper end can weathervane freely around the buoyancy element, wherein in a low force condition when the forces by ocean current, wind and waves are low, the floating element, the buoyancy element and the tension leg are oriented in a vertical direction within 5° from an equilibrium condition and the rigid cross bar is oriented in a horizontal direction within 5° from the equilibrium condition, wherein, in the equilibrium condition, the floating element, the buoyancy element and the tension leg are oriented in the vertical direction and the rigid cross bar is oriented in the horizontal direction; and wherein in a high force condition when the forces by ocean current, wind and waves are high, a shape of the floating element, the rigid cross bar, the buoyancy element and the tension leg is stretched by the forces to provide a stretched shape, wherein the orientation of the vertical and horizontal elements is deviated from the equilibrium condition by more than 5°, which change in shape and dynamic behavior reduce extreme stress levels in the floating windmill the method comprising:
   installing and maintaining the floating windmill in components;
   wherein the installation takes place by transporting the floating element and the wind turbine to a windmill site, where the components are coupled to the buoyancy element that has been preinstalled with an anchor on the seabed; and
   wherein the buoyancy element includes a buoyancy system or facilities for connecting to a buoyancy system on a vessel, comprising a pump and piping and valves, for adjusting a ballast water level, allowing to bring the buoyancy element up and down between a surface position and a submerged position, wherein a coupling of the buoyancy element to the rigid cross bar can take place near or at the surface position.

5. The method according to claim 4, wherein maintenance takes place by replacing components on a windmill field, by installing a new component and transporting away a part that is damaged or needs maintenance or repair, as one combined operation.

6. The method of claim 5, wherein the maintenance takes place by a single trip with a single vessel.

7. The method according to claim 4, wherein the anchor, the tension leg and the buoyancy element are preinstalled, whilst the floating element with the rigid cross bar is coupled to the buoyancy element on a windmill site, wherein cables are preinstalled out from the swivel, arranged on the rigid cross bar and is pulled into an inner part of the floating element, with or without a coupling in a dry location inside the floating element.

* * * * *